(12) United States Patent
Tsukiji et al.

(10) Patent No.: US 11,894,650 B2
(45) Date of Patent: Feb. 6, 2024

(54) FOIL PEELING APPARATUS AND FOIL PEELING METHOD

(71) Applicant: YAZAKI CORPORATION, Tokyo (JP)

(72) Inventors: Nobuto Tsukiji, Makinohara (JP); Miyoshi Mabuchi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 536 days.

(21) Appl. No.: 17/168,170

(22) Filed: Feb. 4, 2021

(65) Prior Publication Data
US 2021/0249832 A1 Aug. 12, 2021

(30) Foreign Application Priority Data
Feb. 6, 2020 (JP) ................. 2020-019099

(51) Int. Cl.
*H02G 1/12* (2006.01)
*H01R 43/28* (2006.01)

(52) U.S. Cl.
CPC ........... *H01R 43/28* (2013.01); *H02G 1/1256* (2013.01); *H02G 1/1297* (2013.01)

(58) Field of Classification Search
CPC ..... H01R 43/28; H02G 1/1297; H02G 1/1256
USPC .......................................................... 83/947
See application file for complete search history.

(56) References Cited

U.S. PATENT DOCUMENTS

| | | | |
|---|---|---|---|
| 5,085,114 A * | 2/1992 | DeRoss | H02G 1/1268 83/947 |
| 5,269,206 A * | 12/1993 | Yagawa | G02B 6/566 81/9.51 |
| 2018/0309272 A1* | 10/2018 | Helmick | H01R 43/05 |

FOREIGN PATENT DOCUMENTS

| | | | | |
|---|---|---|---|---|
| EP | 3270478 A1 * | 1/2018 | | H01R 43/05 |
| JP | H10-42417 A | 2/1998 | | |
| JP | 2019208322 A * | 12/2019 | | H01R 43/28 |
| KR | 20190034116 * | 4/2019 | | |

OTHER PUBLICATIONS

EP-3270478-A1, Translation (Year: 2023).*
JP-2019208322-A, Translation (Year: 2023).*
KR 20190034116 A, Tranlastion (Year: 2023).*

* cited by examiner

*Primary Examiner* — Nhat Chieu Q Do
(74) *Attorney, Agent, or Firm* — KENEALY VAIDYA LLP

(57) ABSTRACT

A foil peeling apparatus includes an electric wire gripping unit configured to grip a multi-core electric wire including wire members linearly arranged in parallel, a foil covering the wire members, and a sheath covering the foil, the sheath being peeled off at a tip end portion of the electric wire such that the foil is exposed. The foil peeling apparatus further includes: a wire member space forming unit configured to be pressed against an exposed portion of the foil between the wire members so as to form a space between the wire members; a foil cutting unit configured to be abutted against the exposed portion of the foil corresponding to the space formed between the wire members so as to form a cut in the foil; and a foil removal unit configured to open the foil from the cut, and cut the foil which has been opened.

7 Claims, 13 Drawing Sheets

FOIL PEELING APPARATUS AND FOIL PEELING METHOD

CROSS-REFERENCE TO RELATED APPLICATIONS

This application is based on and claims the benefit of priority of Japanese Patent Application No. 2020-019099 filed on Feb. 6, 2020, the entire contents of which are incorporated herein by reference.

FIELD

One or more embodiments of the present invention relate to a foil peeling apparatus and a foil peeling method.

BACKGROUND

In related art, when a cable containing a metal foil (aluminum foil, copper foil) therein is subjected to terminal treatment, the metal foil is manually cut off after a sheath is peeled off. However, during processing performed based on a sheath cutting position of an electric wire, there may be a problem in dimensional accuracy when the electric wire is manually set in electric wire processing equipment again after peeling. For example, an apparatus that cuts a metal foil without manual operation has been proposed in JP-A-H10-42417. A peeling apparatus described in JP-A-H10-42417 is a shielded wire peeling apparatus that includes a peeling cutter, and a needle configured to form a hole in a metal foil of a metal foil shielded wire. According to such an apparatus, the hole is formed in the metal foil by the needle simultaneously with cutting of the sheath performed by the cutter, and then the sheath is pulled so as to break the metal foil from the hole.

SUMMARY

However, according to a peeling method using the peeling apparatus described in JP-A-H10-42417, when the metal foil is cut together with the sheath by a cutter (peeling blade), the peeling blade may damage a wire core (wire member) located on an inner side of the metal foil. In particular, a cutting depth of the peeling blade is equal to or higher than a thickness of the sheath and the wire member may be damaged in a case of a shielded electric wire where a wire member is located immediately on an inner side of a metal foil, which is different from a coaxial wire where an insulating layer is located on an inner side of a metal foil and a braid.

One or more embodiments of the present invention have been made in view of the above circumstances, and an object thereof is to remove a foil of a shielded electric wire without damaging any wire member.

In one or more embodiments of the present invention, there is provided a foil peeling apparatus including: an electric wire gripping unit configured to grip a multi-core electric wire, the multi-core electric wire including a plurality of wire members linearly arranged in parallel, a foil covering the plurality of wire members, and a sheath covering the foil, the sheath being peeled off at a tip end portion of the multi-core electric wire such that the foil is exposed; a wire member space forming unit configured to be pressed against an exposed portion of the foil between the plurality of wire members so as to form a space between the plurality of wire members; a foil cutting unit configured to be abutted against the exposed portion of the foil corresponding to the space formed between the plurality of wire members so as to form a cut in the foil; and a foil removal unit configured to open the foil from the cut, and cut the foil which has been opened.

In one or more embodiments of the present invention, there is provided a foil peeling method including: gripping a multi-core electric wire, the multi-core electric wire including a plurality of wire members linearly arranged in parallel, a foil covering the plurality of wire members, and a sheath covering the foil, the sheath being peeled off at a tip end portion of the multi-core electric wire such that the foil is exposed; pressing a wire member space forming unit against an exposed portion of the foil between the plurality of wire members so as to form a space between the plurality of wire members; abutting a foil cutting unit against the plurality of separated wire members so as to form a cut in the foil; and opening the foil from the cut and removing the opened foil.

DETAILED DESCRIPTION

A specific embodiment of the present invention will be described below with reference to the drawings. Hereinafter, a foil removal apparatus and a foil removal method used for removing a foil at a terminal (tip end portion) of a shielded electric wire where a sheath is peeled off and the foil is exposed will be described.

Figure 1:
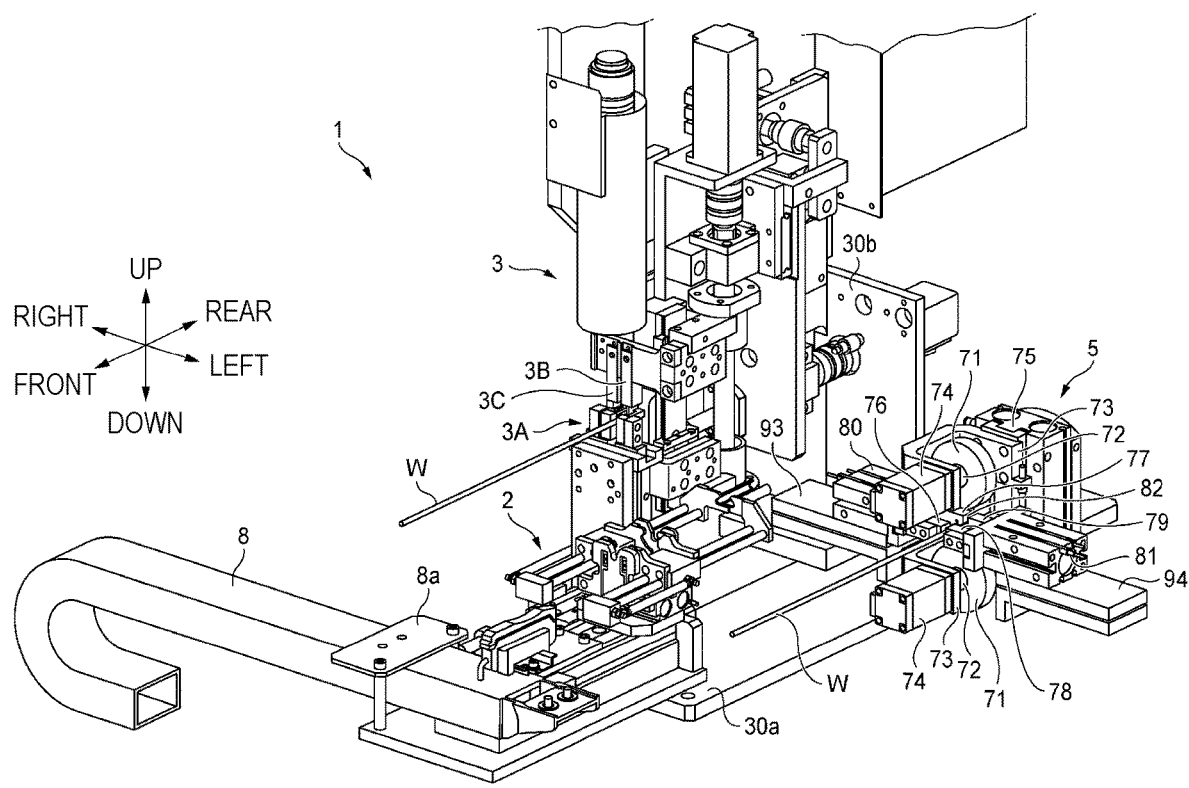
FIG. 1 is a perspective view showing a foil peeling apparatus according to an embodiment of the present invention.

FIG. 1 is a perspective view showing a foil peeling apparatus 1 according to an embodiment of the present invention. As shown in FIG. 1, the foil peeling apparatus 1 includes an electric wire setting apparatus 2, a foil cutting apparatus 3, a foil removal apparatus 5, and a conveying apparatus 8. An object to be processed by the foil peeling apparatus 1 is a shielded electric wire W (FIGS. 2, 10, and 13) which includes two wire members 101 (core wires) linearly arranged in parallel, a foil 102 covering the wire members 101, a braid 103 covering the foil 102, a sheath 104 covering the braid 103, and an annular sleeve 105. The sleeve 105 is externally fitted to a predetermined position on the sheath 104. The wire members 101 are communication lines each including a signal line and a coating covering the signal line, and the two wire members 101 are arranged in parallel without being twisted. In the present embodiment, front, rear, left, right, upper, and lower directions indicates front, rear, left, right, upper, and lower directions of the foil peeling apparatus 1 as shown in FIG. 1 unless otherwise specified. In order to facilitate understanding, illustration of the braid 103 is omitted as appropriate.

The electric wire setting apparatus 2 supplies the shielded electric wire W set by an operator to the foil cutting apparatus 3 and the foil removal apparatus 5. The electric wire setting apparatus 2 is attached to the conveying apparatus 8 via an attachment plate 8a. The electric wire setting apparatus 2 is moved by the conveying apparatus 8 sequentially to respective positions of an electric wire setting module to be described later below, the foil cutting apparatus 3, and the foil removal apparatus 5, which are arranged in parallel in the left-right direction. When the operator sets the shielded electric wire W in the electric wire setting apparatus 2 in a state where the sheath 104 is peeled off at a tip end portion and the braid 103 cut into a predetermined length is folded back on the sleeve 105, subsequent processing is automatically performed by the foil peeling apparatus 1.

The foil cutting apparatus 3 includes an electric wire positioning unit 3A, a wire member space forming unit 3B, and a foil cutting unit 3C. The foil cutting apparatus 3 separates the two wire members 101 of the shielded electric wire W from each other (in other words, the foil cutting apparatus 3 forms a space between the two wire members 101 of the shielded electric wire W) and forms a cut in the foil 102. The electric wire positioning unit 3A grips (positions) the shielded electric wire W from which the sheath 104 is peeled and the foil 102 is exposed. The wire member space forming unit 3B is pressed against the exposed foil 102 between the plurality of wire members 101 so as to separate the plurality of wire members 101 from each other. The foil cutting unit 3C is abutted against the exposed foil 102 between the plurality of separated wire members 101 so as to form the cut in the foil 102.

The foil removal apparatus 5 opens the foil 102 from the cut formed by the foil cutting apparatus 3 in the foil 102 between the two wire members 101, and removes the opened foil 102.

According to the foil peeling apparatus 1, the cut is formed between the two separated wire members 101 so as to open the foil 102 and then the opened foil 102 is removed without abutting any blade (cutting blade 37 or foil cutting blades 82, 83) against the wire member 101, so that the foil 102 can be removed without damaging the wire member 101.

Figure 2:
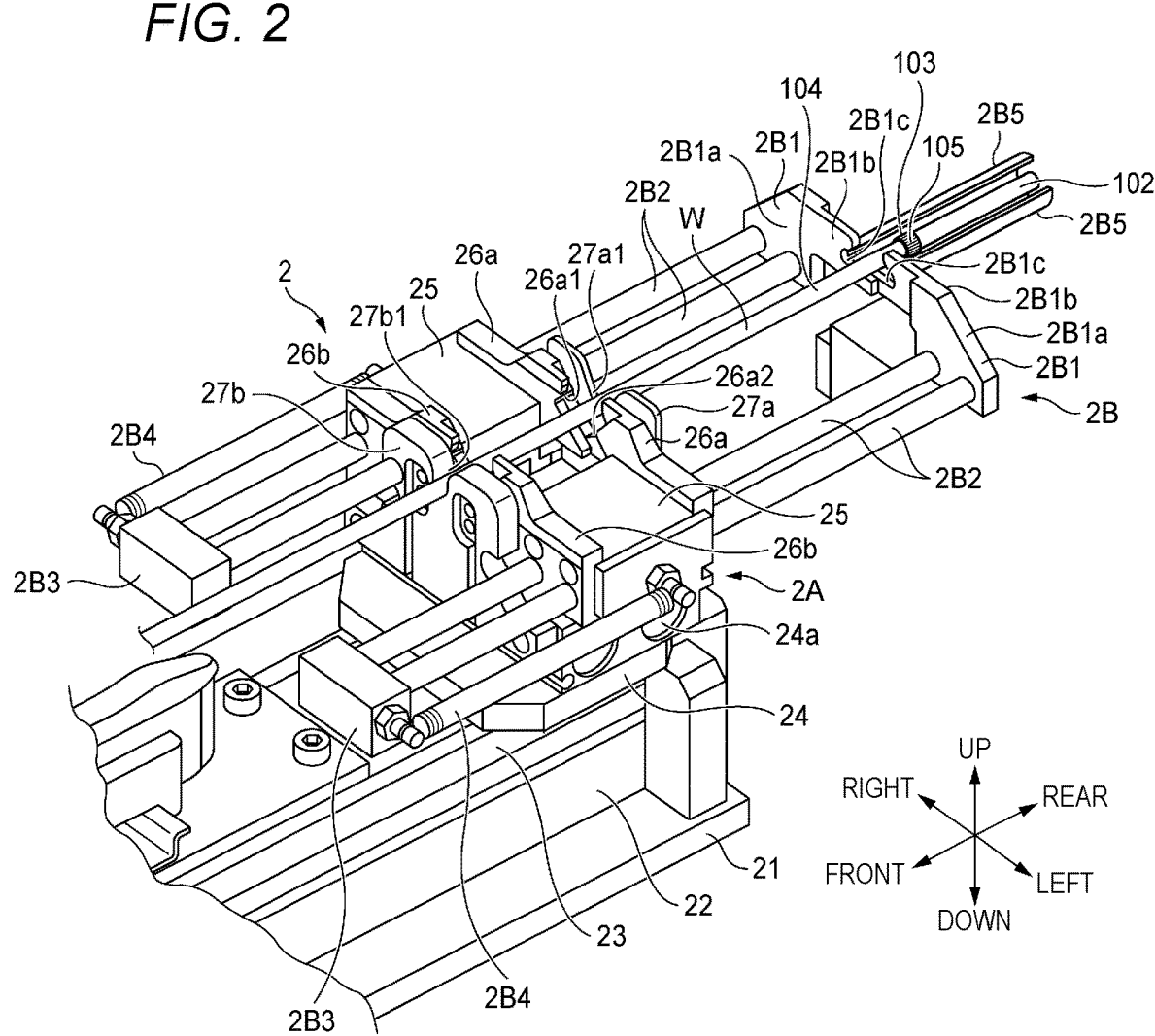
FIG. 2 is a perspective view showing a main part of an electric wire setting apparatus shown in FIG. 1.

FIG. 2 is a perspective view showing a main part of the electric wire setting apparatus 2 shown in FIG. 1. FIG. 2 shows the electric wire setting apparatus 2 in a state before the shielded electric wire W is placed and chucked.

As shown in FIGS. 1 and 2, the electric wire setting apparatus 2 includes a flat plate-shaped base 21, a fixed portion 22 fixed on the base 21, a moving portion 23 attached to the fixed portion 22 so as to be movable in the front-rear direction, and an electric wire gripping portion 2A and an electric wire guide 2B provided on the moving portion 23.

The electric wire gripping portion 2A includes a plate 24 fixed to an upper surface of the moving portion 23, and a pair of blocks 25 provided on the plate 24 and having a substantially rectangular parallelepiped shape. The pair of blocks 25 are movable in the left-right direction along a rail 24a on the plate 24, and the pair of blocks 25 are moved by a driving portion (not shown) to approach and separate from each other. Clamps 26a and 26b are attached to a front surface and a rear surface of each block 25, respectively.

On front surfaces of the pair of clamps 26a, an electric wire holding portion 27a including a recessed portion 27a1 that guides the shielded electric wire W is fixedly arranged on a front side of the rail 24a. On rear surfaces of the pair of clamps 26b, an electric wire holding portion 27b is fixedly arranged on a rear side of the rail 24a. The electric wire holding portion 27b includes a recessed portion 27b1 that guides the shielded electric wire W, and functions as a sensor unit detecting that the shielded electric wire W is arranged in the recessed portion 27b1. The blocks 25 and the clamps 26a and 26b include holes through which four shafts 2B2 to be described later below can be inserted, respectively.

The pair of clamps 26a includes a recessed portion 26a1 in the right clamp 26a and a protruding portion 26a2 on the left clamp 26a at positions facing each other, respectively. The pair of clamps 26b have the same configuration as the pair of clamps 26a. When the pair of blocks 25 approach each other (are closed), the pair of clamps 26a approach each other and the pair of clamps 26b approach each other (are closed). When the clamps 26a and 26b are closed, the shielded electric wire W held by the electric wire holding portions 27a and 27b is held between the recessed portion 26a1 and the protruding portion 26a2 and between the recessed portion and the protruding portion of the clamps 26b.

The electric wire guide 2B includes a pair of tip end plates 2B1, the shafts 2B2 each two of which extend rearward from each tip end plate 2B1, and a pair of blocks 2B3 respectively fixed to rear ends of the each two shafts 2B2. The electric wire guide 2B includes two shafts 2B4 and a braid protection portion 2B5. The shafts 2B2 pass through the blocks 25 and the clamps 26a and 26b in the front-rear direction, and are movable relative to the blocks 25 and the clamps 26a and 26b. The blocks 25 and the blocks 2B3 are connected to each other via the shafts 2B4, each of which is embedded with a spring, so as to be capable of approaching and separating from each other.

The pair of tip end plates 2B1 respectively include body portions 2B1a which have a substantially trapezoidal shape as viewed in the front-rear direction, and extending portions 2B1b extending from the body portions 2B1a in directions facing each other. Semicircular recessed portions 2B1c which are recessed in directions separated from each other are respectively provided in positions facing each other of the extending portions 2B1b. Semi-cylindrical braid protection portions 2B5 which extend forward are respectively provided in positions of the recessed portions 2B1c in the pair of tip end plates 2B1. When the pair of blocks 25 approach each other, the pair of tip end plates 2B1 approach each other, and the two recessed portions 2B1c and the two braid protection portions 2B5 surround the shielded electric wire W where the braid 103 is exposed at the tip end thereof. By closing the two braid protection portions 2B5 and covering an entire circumference of the braid 103 exposed from the sheath 104, the shielded electric wire W can be inserted into the foil cutting apparatus 3 and the foil removal apparatus 5 (processing apparatus) while protecting the braid 103.

Setting of the shielded electric wire W in the electric wire setting apparatus 2 performed by the operator is performed in the electric wire setting module (not shown). In the electric wire setting module, a contact type electric wire tip end detection unit is provided in front of the electric wire setting apparatus 2. The operator places the shielded electric wire W between the recessed portions 27a1 and 27b1 of the electric wire holding portions 27a and 27b, and the two recessed portions 2B1c of the tip end plates 2B1 of the electric wire setting apparatus 2. When the shielded electric wire W is placed in the recessed portion 27b1, detection is performed by the electric wire holding portion 27b. When the operator pushes the shielded electric wire W forward to a predetermined position, detection is performed by the electric wire tip end detection unit. When such detection is performed, the electric wire setting apparatus 2 closes the pair of blocks 25 and chucks the shielded electric wire W by the electric wire gripping portion 2A (see FIG. 4). At this time, the shielded electric wire W is guided by the electric wire guide 2B such that a posture thereof is corrected. Further, it is desirable that the shielded electric wire W is chucked in such a manner that a tip end of the braid 103 does not protrude from the braid protection portion 2B5.

Figure 4:
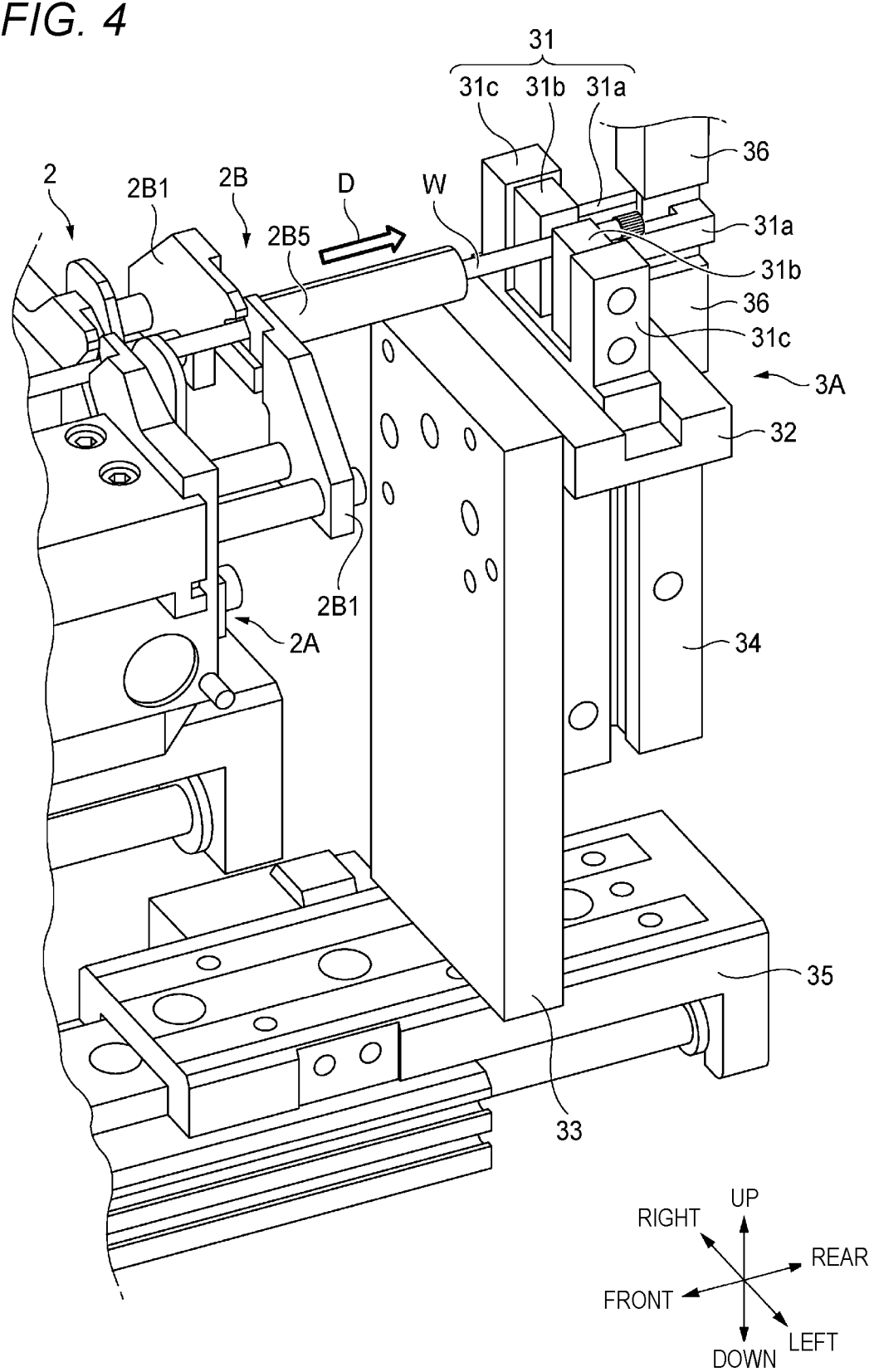
FIG. 4 is a diagram (1) for showing an operation of the foil cutting apparatus.

The shielded electric wire W set in the electric wire setting apparatus 2 is supplied to the processing apparatus (the foil cutting apparatus 3 in FIG. 4) as shown in FIG. 4. When the moving portion 23 moves rearward at a predetermined position in front of the foil cutting apparatus 3 moved by the conveying apparatus 8, the electric wire gripping portion 2A and the electric wire guide 2B of the electric wire setting apparatus 2 approach the foil cutting apparatus 3 (advance in an electric wire insertion direction D shown in FIG. 4). When the tip end plate 2B1 of the electric wire guide 2B is abutted against a stopper (not shown) provided in front of the foil cutting apparatus 3, a position of the electric wire guide 2B is fixed in the front-rear direction, and only the electric wire gripping portion 2A further moves. That is, a front surface (electric wire holding portion 27a) of the electric wire gripping portion 2A and the tip end plate 2B1 approach each other, and the shielded electric wire W gripped by the electric wire gripping portion 2A protrudes forward from the braid protection portion 2B5. Then the shielded electric wire W is inserted into a center position of the electric wire positioning unit 3A.

In this way, when the shielded electric wire W is to be inserted into the foil cutting apparatus 3, the tip end plate 2B1 of the electric wire guide 2B is abutted against the stopper and is pushed toward the electric wire gripping portion 2A. That is, the shielded electric wire W is pushed out toward the foil cutting apparatus 3 by the electric wire gripping portion 2A. Therefore, even when a middle portion or a rear end of the shielded electric wire W is gripped instead of the tip end, the electric wire guide 2B can guide the shielded electric wire W to correct the posture thereof, so that the shielded electric wire W can be inserted straight into the foil cutting apparatus 3. When the foil 102 is processed, a portion of the foil 102 to be processed can be exposed by pressing the braid protection portion 2B5 toward the electric wire gripping portion 2A. The shield electric wire W inserted into the foil cutting apparatus 3 is positioned in the left-right direction by the electric wire positioning unit 3A.

Figure 3:
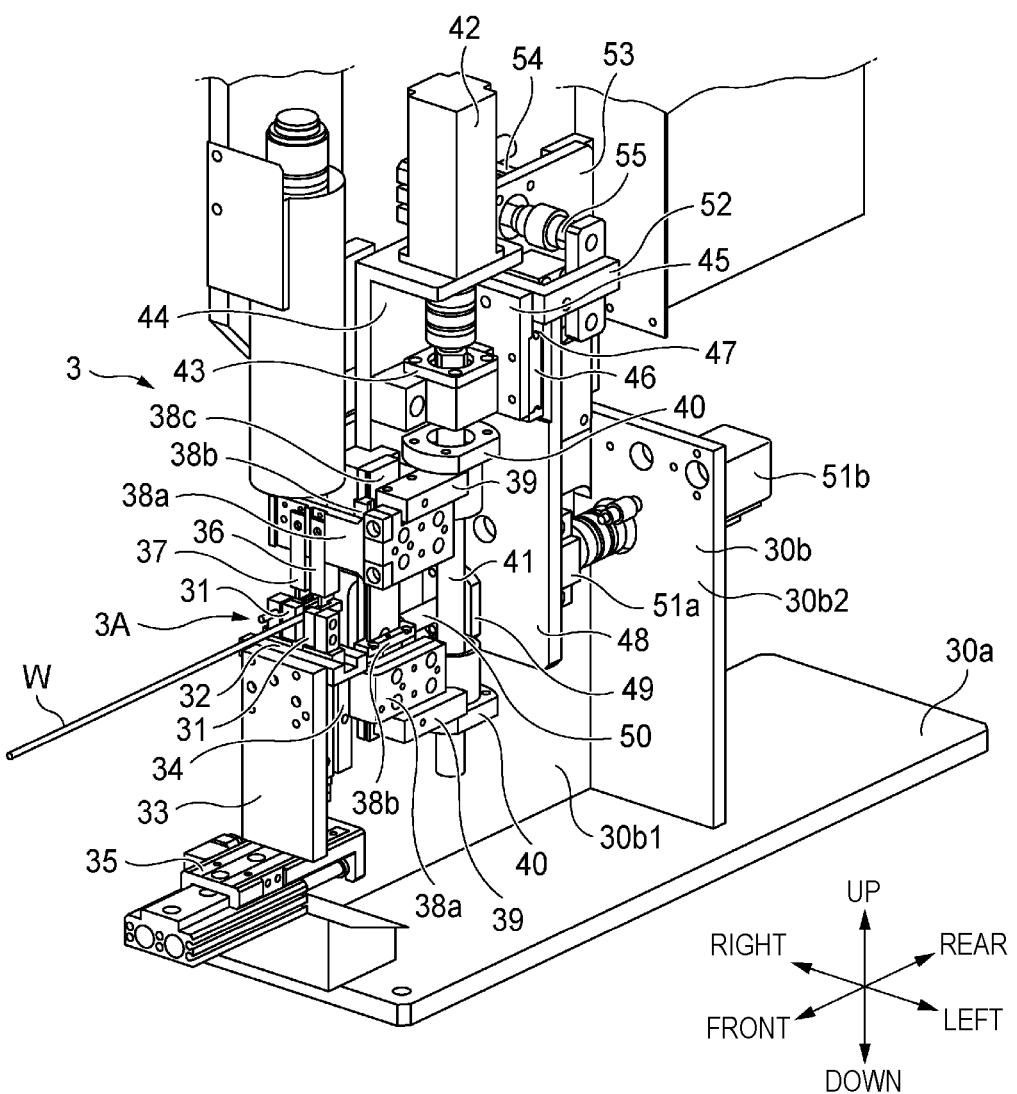
FIG. 3 is a perspective view showing a main part of a foil cutting apparatus shown in FIG. 1.
Figure 7:
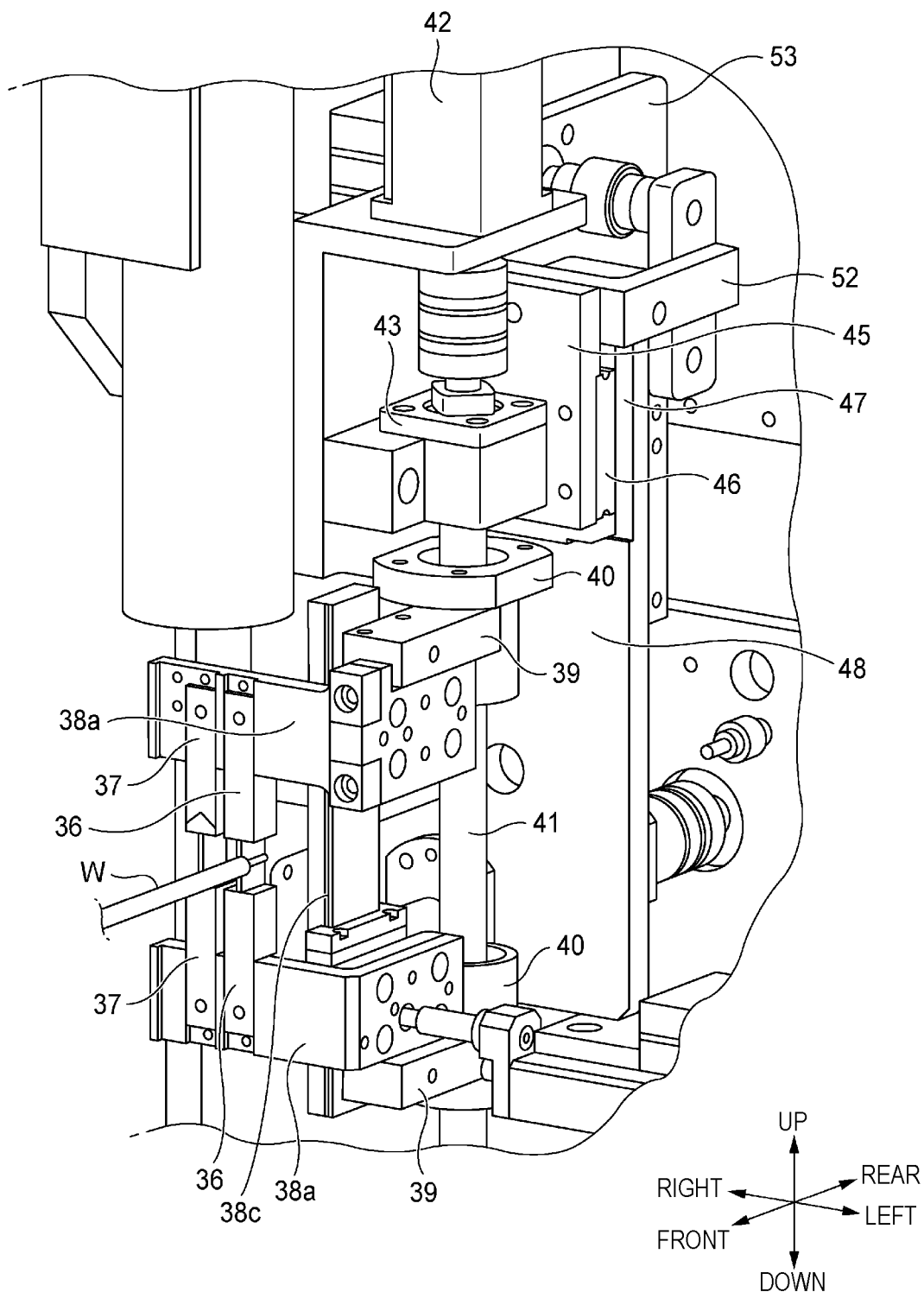
FIG. 7 is a diagram (4) for showing the operation of the foil cutting apparatus.
Figure 8A:
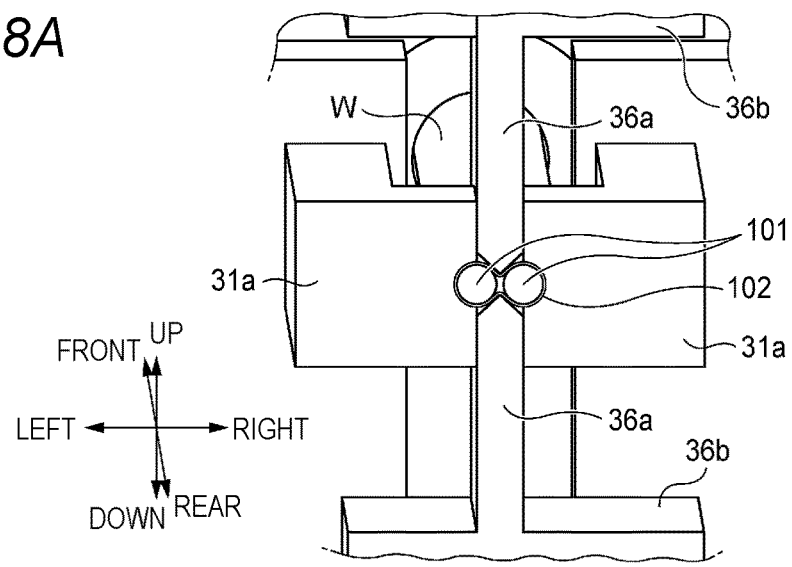
FIGS. 8A to 8C illustrate a main part enlarged view of a wire member space forming unit shown in FIG. 3.
Figure 8B:
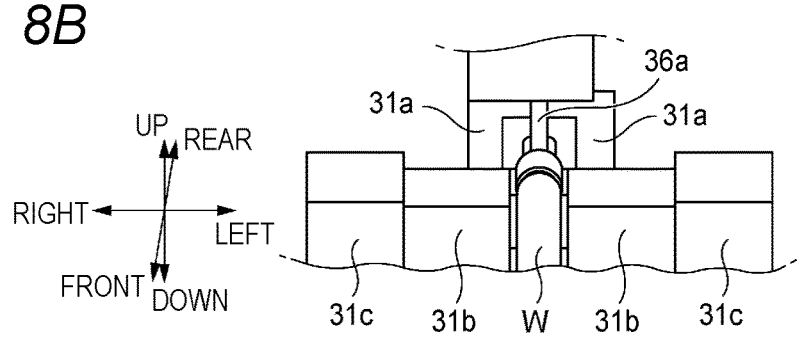
Figure 8C:
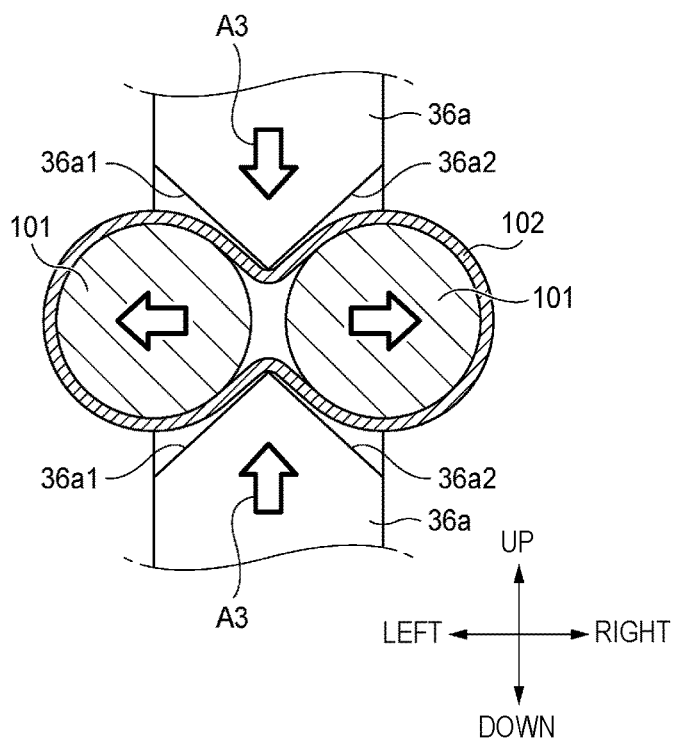
Figure 9:
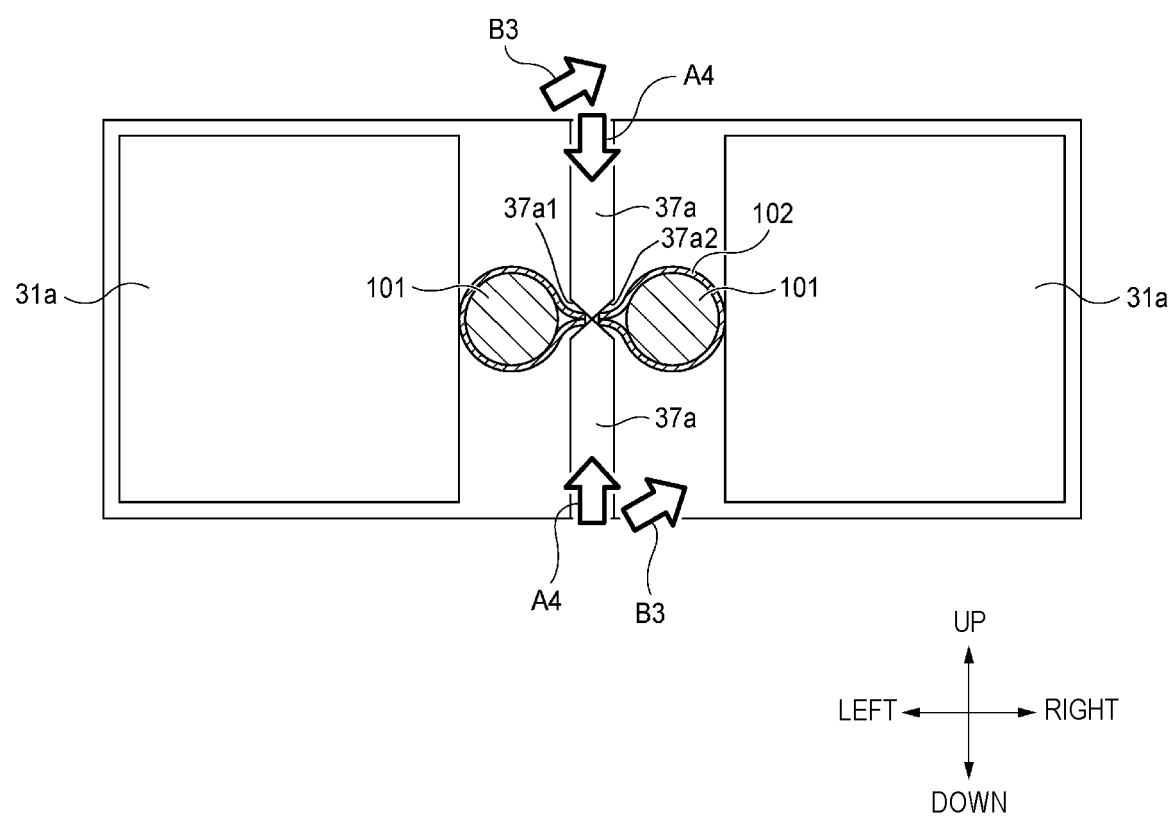
FIG. 9 is a main part enlarged view of a foil cutting unit shown in FIG. 3.

FIG. 3 is a perspective view showing a main part of the foil cutting apparatus 3 shown in FIG. 1. FIGS. 4 to 7 show an operation of the foil cutting apparatus 3. FIGS. 8A to 8C are main part enlarged views of the wire member space forming unit 3B. FIG. 8A is a view as viewed from the rear, FIG. 8B is an enlarged view of FIG. 8A, and FIG. 8C is a view as viewed from the front. FIG. 9 is a main part enlarged view of the foil cutting unit 3C. In FIG. 7, illustration of the electric wire positioning unit 3A is omitted. As shown in FIGS. 1 and 3, in the foil cutting apparatus 3, a base frame 30b which has an L shape in a top view is erected on a base 30a which has a flat plate shape, and the electric wire positioning unit 3A is arranged in front of the base 30a. The wire member space forming unit 3B and the foil cutting unit 3C are provided behind the electric wire positioning unit 3A.

The electric wire positioning unit 3A includes a foil chuck 31 that guides the tip end portion of the shielded electric wire W where the foil 102 is exposed to a fixed position, a rail 32, a plate 33, a driving portion 34, and a moving portion 35. The rail 32 includes a groove which accommodates a lower portion of the foil chuck 31 and extends in the left-right direction. The plate 33 is a rectangular flat plate erected on an upper surface of the moving portion 35 in front of the base 30a, and the driving portion 34 is provided on one surface on the rear side. The driving portion 34 is located below the rail 32 which extends in the left-right direction, and drives in such a manner that the foil chuck 31 on the rail 32 is opened and closed so as to grip and release the tip end portion (foil 102) of the shielded electric wire W. The moving portion moves the plate 33 in the front-rear direction.

As shown in FIG. 4, the foil chuck 31 includes a pair of foil chuck bodies 31a, a pair of blocks 31b, and a pair of claws 31c, which respectively face each other with the shielded electric wire W interposed therebetween. The foil chuck bodies 31a are prismatic members having an L shape in a top view, and include linear portions extending in the front-rear direction and protruding portions protruding from rear ends of the linear portions toward the shielded electric wire W. A tip end of a portion of the shielded electric wire W where the foil 102 is exposed is guided between the pair of protruding portions. The blocks 31b are prismatic members fixed to front end sides of the foil chuck bodies 31a. The claws 31c are substantially L-shaped members as viewed in the front-rear direction. The blocks 31b are fixed to portions of the claws 31c extending in the left-right direction. The portions of the claws 31c extending in the left-right direction are accommodated in the rail 32. When the pair of claws 31c are opened and closed by the driving portion 34, the pair of blocks 31b and the pair of foil chuck bodies 31a are opened and closed. By closing the pair of foil chuck bodies 31a, the tip end (foil 102) of the shielded electric wire W is positioned in the left-right direction. By moving the moving portion 35 in the front-rear direction, the shielded electric wire W can be positioned in the front-rear direction.

In this way, the shield electric wire W is conveyed by the electric wire setting apparatus 2 and the conveying apparatus 8 to the predetermined position in front of the foil cutting apparatus 3, and the tip thereof is guided to the fixed position by the electric wire positioning unit 3A.

Next, the wire member space forming unit 3B and the foil cutting unit 3C will be described. As shown in FIGS. 3 and 7, the foil cutting apparatus 3 includes a pair of pressing blades 36 and a pair of cutting blades 37 which are provided on upper and lower sides such that the shielded electric wire W gripped by the electric wire positioning unit 3A is interposed therebetween. The foil cutting apparatus 3 includes a pair of brackets 38a, a pair of sliders 38b, a rail 38c, a pair of blocks 39, and a pair of nuts 40. The foil cutting apparatus 3 further includes screw shafts 41 and 50, driving portions 42, 51b, and 54, attachment portions 43 and 51a, plates 44, 45, 48, and 53, sliders 46 and 56, rails 47 and 57, a nut 49, a joint 52, and a rod 55. The pair of pressing blades 36, the pair of cutting blades 37, the pair of brackets 38a, the pair of sliders 38b, the rail 38c, the pair of blocks 39, and the pair of nuts 40 are provided vertically and symmetrically relative to a plane where the shielded electric wire W is placed. Hereinafter, each member provided on the upper side will be described, and description of each member provided on the lower side will be omitted.

As shown in FIG. 7, the pressing blade 36 includes a pressing blade body 36a and a block 36b which has a substantially rectangular parallelepiped shape. As shown in FIG. 8B, the pressing blade body 36a includes blade surfaces 36a1 and 36a2 which form a V shape as viewed in the front-rear direction. A blade angle α formed by the blade surfaces 36a1 and 36a2 is an angle (for example, 90°) at which the blade surfaces 36a1 and 36a2 press the two wire members 101 in direction in which the two wire members 101 are separated from each other in a state where the pressing blade body 36a is pressed between the two wire members 101 via the foil 102. The blade angle α is set to an angle at which the foil 102 is not cut when the pressing blade body 36a is abutted against the foil 102. A front-rear direction length of the pressing blade body 36a corresponds to a length of the exposed foil 102 of the shielded electric wire W. The pressing blade body 36a is provided on a lower end surface of the block 36b. One surface on the front side of the block 36b extends upward and is attached to the bracket 38a.

As shown in FIG. 7, the cutting blade 37 includes a cutting blade body 37a and a block 37b which has a substantially rectangular parallelepiped shape. As shown in FIG. 9, the cutting blade body 37a includes blade surfaces 37a1 and 37a2 which form a V shape as viewed in the front-rear direction. A blade angle β formed by the blade surfaces 37a1 and 37a2 is an angle (for example, 45°) at which the foil 102 is cut by a shear stress generated at an intersection line between the blade surface 37a1 and the blade surface 37a2 in a state where the cutting blade body 37a is abutted between the two separated wire members 101 via the foil 102. The blade angle α is larger than the blade angle β. A front-rear direction length of the cutting blade body 37a corresponds to the length of the exposed foil 102 of the shielded electric wire W. The cutting blade body 37a is provided on a lower end surface of the block 37b. One surface on the front side of the block 37b extends upward and is attached to the bracket 38a.

The bracket 38a includes a front surface portion 38a1 extending in the left-right direction, and a side surface portion 38a2 extending rearward from a left side end portion of the front surface portion 38a1. The block 36b and the block 37b are provided in parallel in the left-right direction on the front surface portion 38a1. An upper side of the side surface portion 38a2 is fixed to the nut 40 via the block 39. The nut 40 is attached to the screw shaft 41, which is arranged along the up-down direction, so as to be movable in the up-down direction. The screw shaft 41 is fixed to the plate 44 that extends in the front-rear direction within a vertical plane (up-down plane) via the attachment portion 43 provided on an upper portion thereof. The screw shaft 41 is connected to a driving shaft of the driving portion 42 provided on an upper end thereof and is rotated, thereby moving the pair of nuts 40 to approach or separate from each other in the up-down direction. When the pair of nuts 40 approach or separate from each other (arrow A1 in FIG. 6), the pair of brackets 38a approach or separate from each other (arrow A2 in FIG. 6), and the pair of pressing blades 36 and the pair of cutting blades 37 approach (are closed) or separate (are opened) from each other.

The plate 45 which extends in the left-right direction within the vertical plane is fixed to a rear side surface of the plate 44. The plate 45 is attached to the slider 46 that is movable in the left-right direction along the rail 47 extending in the left-right direction. The rail 47 is fixed to a front surface of the plate 48 which extends in the left-right direction within the vertical plane. The nut 49 is fixed below the plate 48. The nut 49 is attached to the screw shaft 50, which is arranged along the front-rear direction, so as to be movable in the front-rear direction. The screw shaft 50 is fixed to a side surface 30b1 of the base frame 30b via the attachment portion 51a attached to the rear side thereof. The side surface 30b1 extends in the front-rear direction within the vertical plane. The base frame 30b is constituted by the side surface 30b1 and a rear surface 30b2 extending leftward from a rear end of the side surface 30b1. The screw shaft 50 is connected to a drive shaft of the driving portion 51b provided on a rear end thereof and is rotated, thereby moving the nut 49 in the front-rear direction (arrow B1 in FIG. 6). When the nut 49 is moved in the front-rear direction, the plate 48 is moved in the front-rear direction, and the pair of brackets 38a connected to the plate 48 via the plates 45, 44 and the like are moved in the front-rear direction (arrow B2 in FIG. 6). As a result, the pair of pressing blades 36 and the pair of cutting blades 37 are moved in the front-rear direction.

The joint 52 which has a substantially U shape in a top view is fixed to a rear surface of the plate 45. A rear end of the joint 52 is fixed to one end of the rod 55 which is arranged along the left-right direction. The other end of the rod 55 is connected to the driving portion 54 via the plate 53. The plate 53 extends in the front-rear direction within the vertical plane and is fixed to the side surface 30b1 of the base frame 30b. When the rod 55 is moved in the left-right direction (arrow C1 in FIG. 6) due to driving of the driving portion 54, the joint 52 is moved in the left-right direction, and the plate 45 fixed to the joint 52 slides in the left-right direction relative to the plate 48. Then the pair of brackets 38a connected to the plate 45 via the plate 44 and the like are moved in the left-right direction (arrow C2 in FIG. 6). As a result, the pair of pressing blades 36 and the pair of cutting blades 37 are moved in the left-right direction.

The pair of pressing blades 36 and the respective portions that drive the pair of pressing blades 36 constitute the wire member space forming unit 3B. The pair of cutting blades 37 and the respective portions that drive the pair of cutting blades 37 constitute the foil cutting unit 3C.

Figure 5:
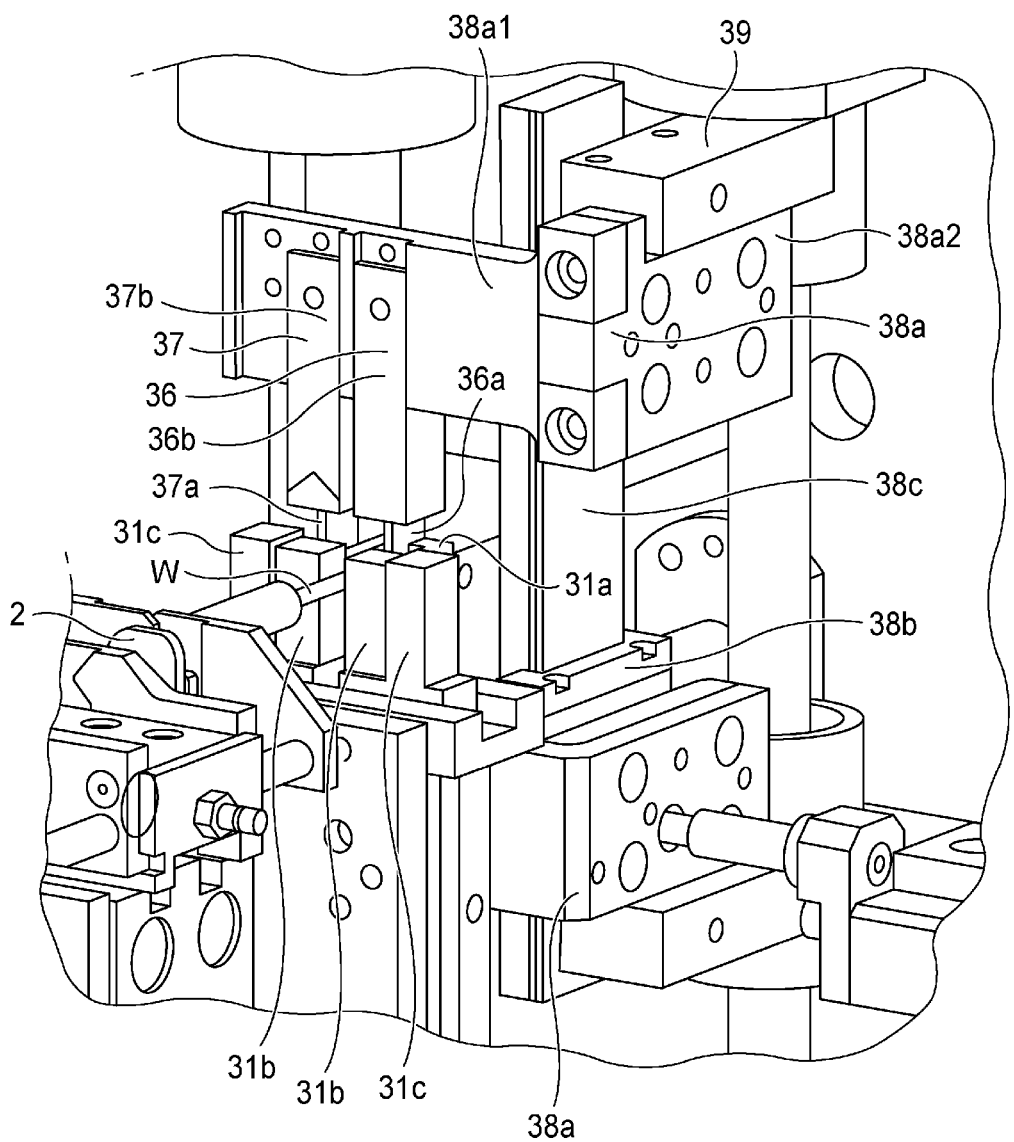
FIG. 5 is a diagram (2) for showing the operation of the foil cutting apparatus.
Figure 5:
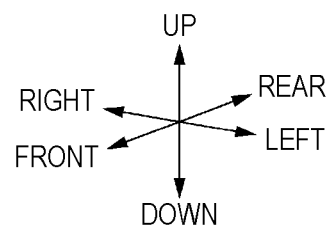
Figure 6:
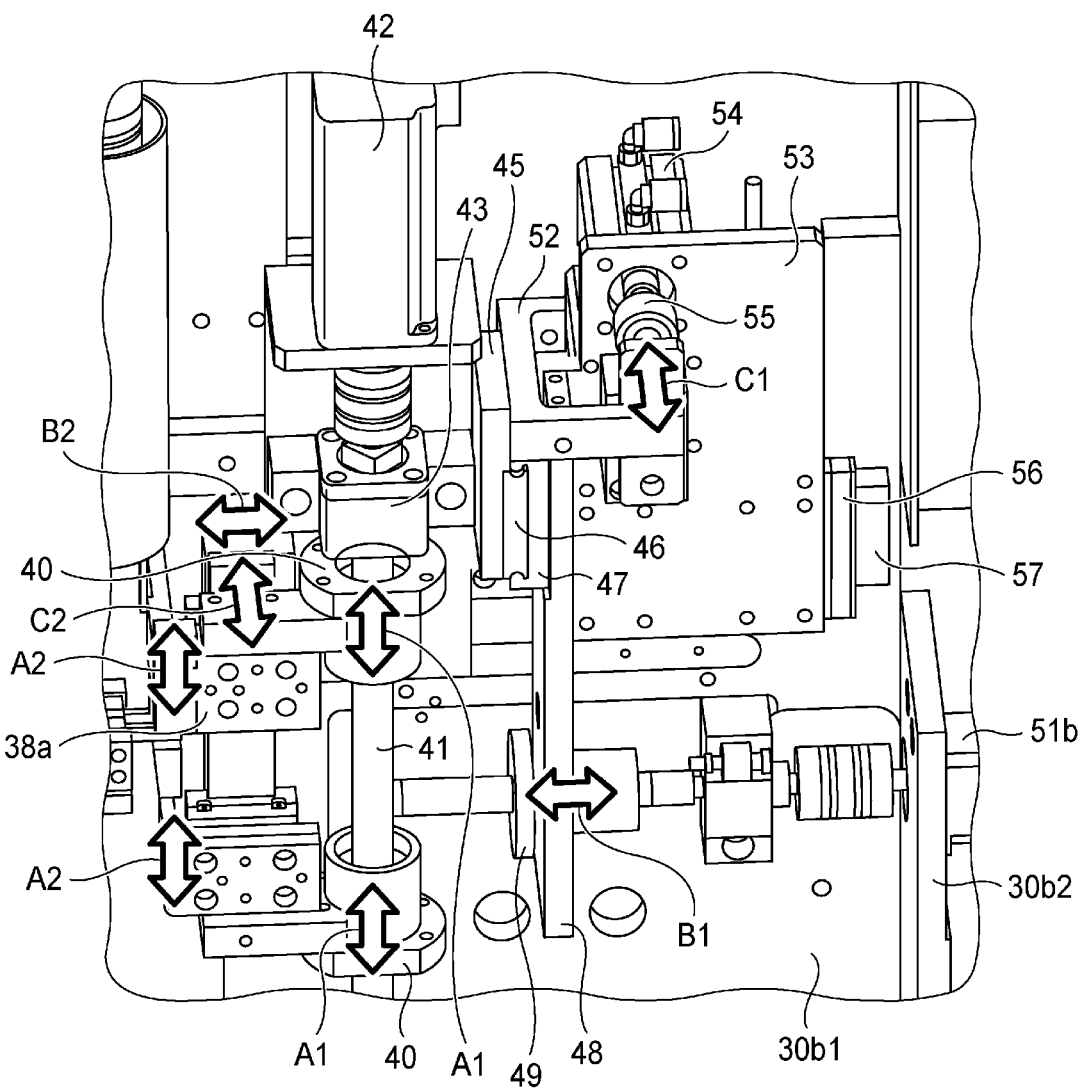
FIG. 6 is a diagram (3) for showing the operation of the foil cutting apparatus.
Figure 6:
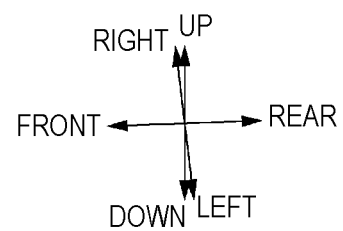

Next, the operation of the foil cutting apparatus 3 configured as described above will be described. As shown in FIG. 4, when the shielded electric wire W set in the electric wire setting apparatus 2 is conveyed to the predetermined position in front of the foil cutting apparatus 3, the shielded electric wire W is moved rearward and inserted between the pair of opened foil chucks 31 (FIG. 5). At this time, the pair of pressing blades 36 of the wire member space forming unit 3B is arranged between the pair of foil chucks 31.

When the pair of foil chucks 31 are closed, the foil 102 of the shielded electric wire W is guided to the fixed position by the pair of foil chuck bodies 31a. When the pair of pressing blades 36 (wire member space forming unit 3B) is closed (arrow A3 in FIG. 8C), the pair of pressing blade bodies 36a is pressed between the two wire members 101 via the foil 102 from the up-down direction of the shielded electric wire W. Then the two wire members 101 pressed by the blade surfaces 36a1 and 36a2 are separated from each other (FIG. 8C). Thereafter, the pair of pressing blades 36 are opened.

Next, the pair of foil chucks 31 are opened and moved forward. At this time, since the shielded electric wire W is held by the electric wire setting apparatus 2, a position of the shielded electric wire W is not changed. The pair of pressing blades 36 and the pair of cutting blades 37 move rightward (arrow C2 in FIG. 6), and the pair of foil chucks 31 move rearward. When the pair of cutting blades 37 are arranged between the pair of foil chucks 31, the pair of foil chucks 31 are closed, and the foil 102 is guided to the fixed position (FIG. 9).

Thereafter, when the pair of cutting blades 37 (foil cutting unit 3C) are closed (arrow A4 in FIG. 9), the pair of cutting blade bodies 37a are abutted against the foil 102 from the up-down direction of the shielded electric wire W between the two separated wire members 101. When the cutting blade bodies 37a come into contact with (abutted against) the foil 102, the foil 102 is cut at the intersection line between the blade surfaces 37a1 and 37a2 (FIG. 9). The pair of cutting blades 37 are moved in a closed state rearward due to movement of the bracket 38a (arrow B3 in FIG. 9). When the pair of cutting blades 37 are moved rearward while being closed, the foil 102 is reliably cut.

When the foil 102 is cut between the two wire members 101, the pair of cutting blades 37 and the pair of pressing blades 36 are opened, and the pair of foil chucks 31 are also opened. The pair of opened foil chucks 31 move forward and the shielded electric wire W set in the electric wire setting apparatus 2 also moves forward.

Figure 10:
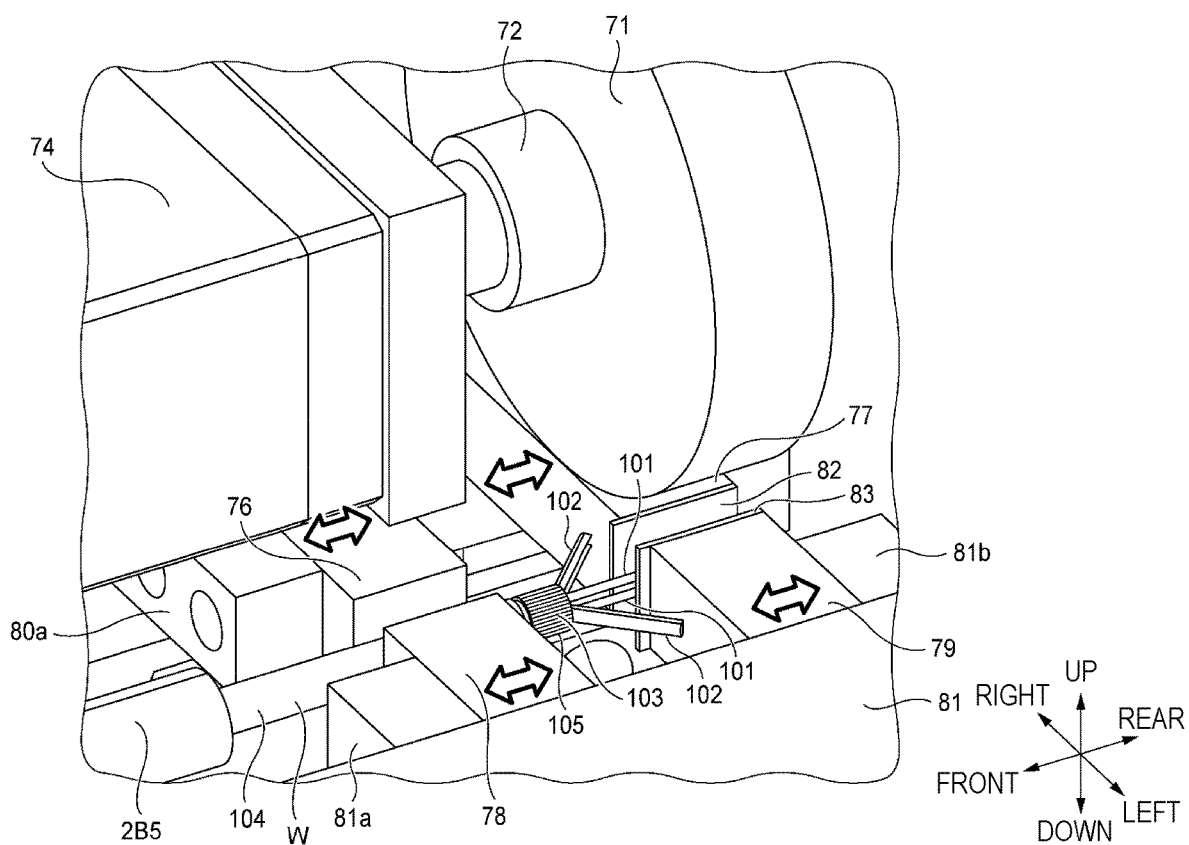
FIG. 10 is a main part enlarged view of a foil removal apparatus shown in FIG. 1.
Figure 11A:
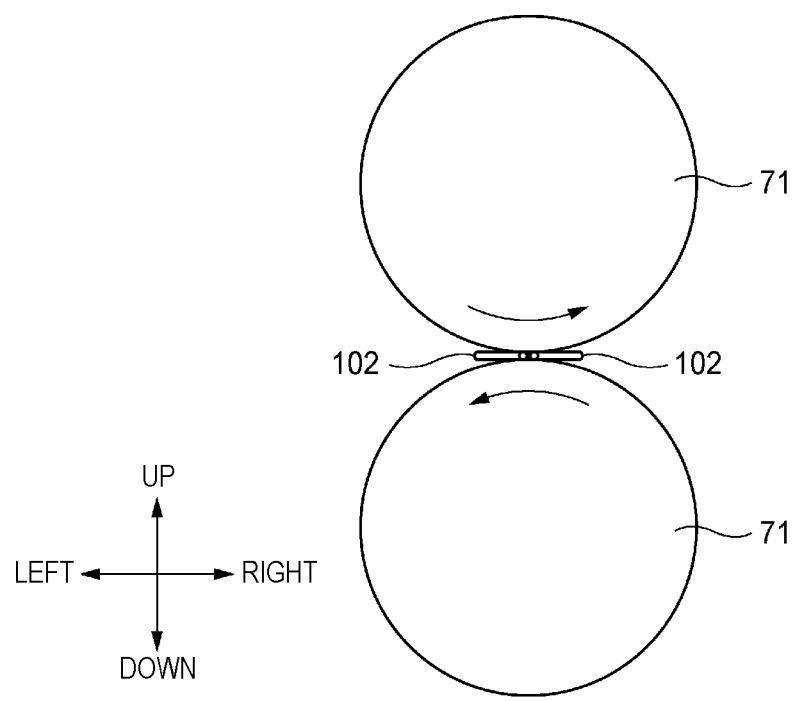
FIGS. 11A and 11B illustrate a diagram (1) for showing an operation of the foil removal apparatus.
Figure 11B:
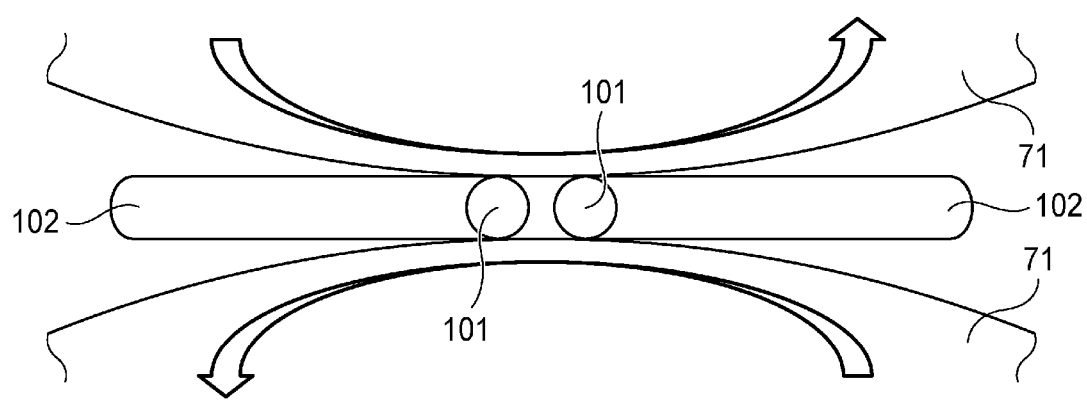
Figure 12:
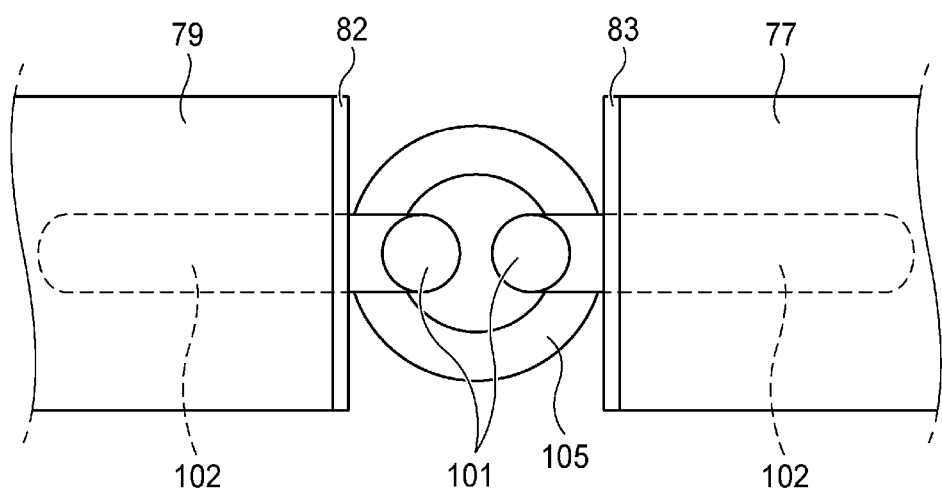
FIG. 12 is a diagram (2) for showing the operation of the foil removal apparatus.
Figure 12:
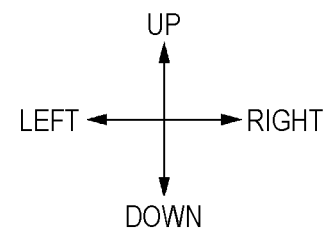
Figure 13:
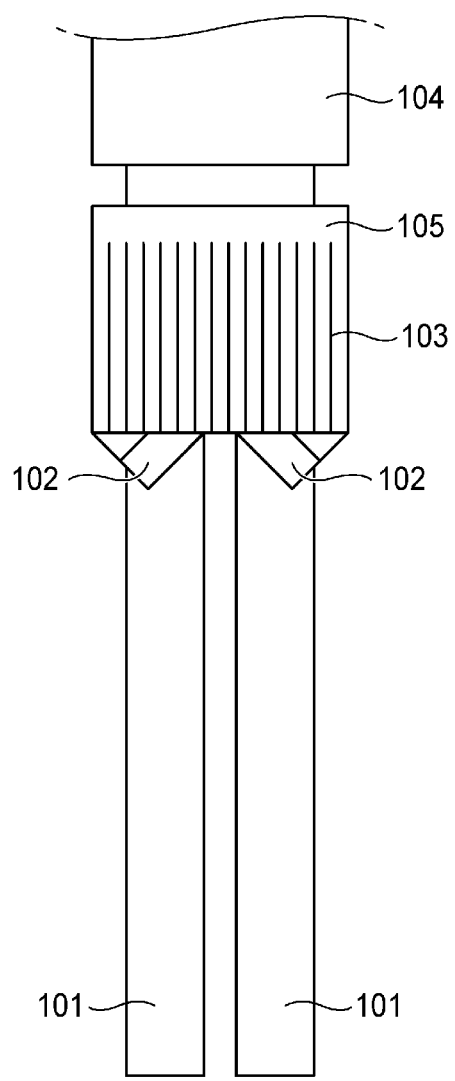
FIG. 13 shows a shielded electric wire in a state where a foil is removed.

FIG. 10 is a main part enlarged view of the foil removal apparatus 5 shown in FIG. 1. FIGS. 11A and 11B and FIG. 12 show an operation of the foil removal apparatus 5. FIG. 11A shows a state where the foil 102 is opened in the left-right direction by a pair of brushes 71, and FIG. 11B is an enlarged view of FIG. 11A. FIG. 13 shows the shielded electric wire W in a state where the foil 102 is removed. In FIG. 12, the claws 60b and 61b are not shown.

As shown in FIGS. 1 and 10, the foil removal apparatus 5 includes the two brushes 71, two brush holding portions 72, two brackets 73, two brush driving portions 74, and a brush attachment block 75. The foil removal apparatus 5 includes foil chucks 76 to 79, driving portions 80 and 81, claws 80a, 80b, 81a, and 81b, two foil cutting blades 82, and moving portions 93 and 94. The shielded electric wire W set in the electric wire setting apparatus 2 is inserted between the two brushes 71.

The brush 71 includes a rotary shaft in the front-rear direction, and is a brush made of a material that peels off the foil 102 from the wire member 101. The rotary shaft of the brush 71 is coupled to a rotary shaft of the brush driving portion 74 via the brush holding portion 72 and the bracket 73. The bracket 73 is a rectangular plate bent so as to have a substantially U shape. The brush driving portion 74 is arranged on one surface extending in the left-right direction of the bracket 73. A back surface of one surface of the bracket 73 facing the brush driving portion 74 is slidably attached to the brush attachment block 75. As shown in FIGS. 11A and 11B, the brush driving portion 74 rotates the upper brush 71 counterclockwise and rotates the lower brush 71 clockwise. The two brushes 71 are movable by a driving portion (not shown) so as to approach and separate from each other. When the shielded electric wire W (tip end portion where the foil 102 is exposed) is inserted between the two brushes 71, the two brushes 71 move to approach the shielded electric wire W and abut against the foil 102. The brush attachment block 75 is fixed onto a base plate (not shown) by a support member (not shown).

Between the two brushes 71, block-shaped foil chucks 78 and 79, claws 81a and 81b that move the foil chucks 78 and 79, respectively, and a driving portion 81 that slidably holds the claws 81a and 81b in the front-rear direction are provided on the left side of the shielded electric wire W. On the right side of the shielded electric wire W, block-shaped foil chucks 76 and 77, claws 80a and 80b that moves the foil chucks 76 and 77, respectively, and a driving portion 80 that slidably holds the claws 80a and 80b in the front-rear direction are provided. The foil chucks 76 and 77 and the foil chucks 78 and 79 are operated in conjunction with each other by the driving portions 80 and 81. The foil chucks 78 and 79 approach or separate from each other at the same time as the foil chucks 76 and 77 approach or separate from each other (FIG. 10). As shown in FIG. 10, the foil chucks 76 and 77 grip the opened foil 102 on the right side, while the foil chucks 78 and 79 grip the opened foil 102 on the left side.

The foil cutting blades 82 and 83 are attached to surfaces facing each other of the foil chucks 77 and 79, respectively. The foil cutting blades 82 and 83 are arranged in such a manner that blade edges thereof protrude forward from the foil chucks 77 and 79, and thus the foil 102 which is abutted against the foil cutting blades 82 and 82 is cut. The moving portions 93 and 94 cause the driving portions 80 and 81 mounted on upper surfaces thereof to approach or separate from each other in the left-right direction.

The operation of the foil removal apparatus 5 configured as described above will be described. As shown in FIG. 10, the shielded electric wire W set in the electric wire setting apparatus 2 is arranged between the foil chucks 76 and 78 and the foil cutting blades 82 and 83. In this state, the pair of brushes 71 which are arranged on the upper and lower sides with the shielded electric wire W interposed therebetween approach each other while rotating, and are abutted against the foil 102 where the cut is formed. When each brush 71 rotates in the left-right direction, the foil 102 which is separated from the cut toward the left and right sides are moved to the left and right sides, respectively, as shown in FIGS. 11A and 11B.

Next, as shown in FIG. 10, when the foil chucks 76 and 77 approach each other and the foil chucks 78 and 79 approach each other in conjunction, the foil 102 which is spread in the left-right direction is held between the foil chucks 76 and 77 and between the foil chucks 78 and 79 (FIG. 12). At this time, the gripped foil 102 is abutted against the foil cutting blades 82 and 83 and is cut. The cut foil 102 is gripped and removed by the foil chucks 76 and 77 and the foil chucks 78 and 79. As shown in FIG. 13, the two wire members 101 are exposed at the tip end portion of the shielded electric wire W from which the foil 102 is removed by the foil peeling apparatus 1, and a small amount of the foil 102 whose tip end is cut is left in the vicinity of an end portion of the sleeve 15. The foil 102 left in the vicinity of the sleeve 15 is sheared by the cutting blade 37 and the foil cutting blades 82 and 83 to form a sharp cut surface.

As described above, according to the foil peeling apparatus 1 of the present embodiment, the foil 102 where the cut is formed is opened between the separated wire members 101, and the opened foil 102 is removed. Therefore, since no blade (the cutting blade 37 or the foil cutting blades 82 and 83) is abutted against the wire member 101, the foil 102 can be removed without damaging the wire member 101. Moreover, since the foil can be removed without removing the electric wire, which is a multi-core wire including the wire member without any insulating layer on an inner side of the foil, from any equipment, so that terminal processing can be performed with high dimensional accuracy. Moreover, according to such configurations, it is not necessary to manually cut the foil and manage uncut materials, and thus automation is enabled, so that it is possible to improve processing quality.

The present invention is not limited to the above embodiment, and can be appropriately modified and improved. Materials, shapes, sizes, numerical values, forms, numbers, arrangement positions, and the like of components in the above embodiment are set as desired and not limited as long as the present invention can be achieved. For example, although the object to be processed by the foil peeling apparatus 1 is the shielded electric wire W in which the two wire members 101 are not twisted (arranged straight) in the above-described embodiment, the number of the wire members is not limited to two, and may be, for example, four. Moreover, a shielded electric wire which does not include the braid 103 between the wire member 101 and the metal foil 102 may also be the object to be processed. Further, the foil cutting blades 82 and 83 may not be provided in the foil removal apparatus 5, and the foil 102 may also be removed by breaking.

Although the foil 102 is opened by the brush 71 in the embodiment described above, instead of the brush 71, the foil 102 may also be opened in the left-right direction by blowing air from an electric wire tip end side to the foil 102 where the cut is formed. By blowing air, the foil 102 can still be opened without damaging the wire member 101.

In the above-described embodiment, the pair of foil chucks 31 grip (guide) the tip end portion (portion where the foil 102 is exposed) of the shielded electric wire W. However, instead of the foil chucks 31, the tip end portion of the shielded electric wire W may also be guided by a hole into which the tip end portion of the shielded electric wire W is inserted.

Here, features of the foil peeling apparatus and the foil peeling method according to the above embodiment of the present invention will be briefly summarized in the following configurations [1] to [10].

[1] A foil peeling apparatus (1) includes: an electric wire gripping unit (electric wire positioning unit 3A) configured to grip a multi-core electric wire (shielded electric wire W), the multi-core electric wire including a plurality of wire members (101) linearly arranged in parallel, a foil (102) covering the plurality of wire members, and a sheath (104) covering the foil, the sheath being peeled off at a tip end portion of the multi-core electric wire such that the foil is exposed;
a wire member space forming unit (3B) configured to be pressed against an exposed portion of the foil between the plurality of wire members so as to form a space between the plurality of wire members;
a foil cutting unit (3C) configured to be abutted against the exposed portion of the foil corresponding to the space formed between the plurality of wire members so as to form a cut in the foil; and a foil removal unit (foil removal apparatus 5) configured to open the foil from the cut, and cut (remove) the foil which has been opened.

[2] The foil peeling apparatus according to [1], in which the wire member space forming unit includes at least one pressing blade (36) whose blade angle is a first angle, and the foil cutting unit includes at least one cutting blade (37) whose blade angle is a second angle that is smaller than the first angle.

[3] The foil peeling apparatus according to [2], in which the at least one pressing blade includes a pair of the pressing blades (36) facing each other with the multi-core electric wire interposed therebetween, and the wire member space forming unit forms the space between the plurality of wire members by placing the pair of pressing blades to be close to each other to press against the exposed portion of the foil between the plurality of wire.

[4] The foil peeling apparatus according to [2] or [3], in which the at least one cutting blade includes a pair of the cutting blades (37) facing each other with the multi-core electric wire interposed therebetween, and
The foil cutting unit forms the cut in the foil by abutting the pair of cutting blades against the exposed portion of the foil corresponding to the space formed between the plurality of separated wire members.

[5] The foil peeling apparatus according to any one of [1] to [4], in which the foil removal unit further includes:
a foil opening portion (brush 71) configured to open the foil along the cut; and
a foil cutting blade (82, 83) configured to cut the opened foil.

[6] The foil peeling apparatus according to [5], in which the foil opening portion includes a rotary brush, and
the foil opening portion opens the foil by abutting the rotary brush against the foil in which the cut has been formed and rotating the rotary brush in a direction intersecting an extending direction of the multi-core electric wire.

[7] The foil peeling apparatus according to [5], in which the foil opening portion opens the foil by blowing air from a tip end side of the multi-core electric wire to the foil in which the cut has been formed.

[8] The foil peeling apparatus according to any one of [5] to [7] further includes: a foil chuck (76 to 79) configured to grip the opened foil.
The foil cutting blade is provided on a part of the foil chuck (77, 79).

[9] A foil peeling method includes: gripping a multi-core electric wire (shielded electric wire W), the multi-core electric wire including a plurality of wire members (101) linearly arranged in parallel, a foil (102) covering the plurality of wire members, and a sheath (104) covering the foil, the sheath being peeled off at a tip end portion of the multi-core electric wire such that the foil is exposed;
pressing a wire member space forming unit (3B) against an exposed portion of the foil between the plurality of wire members so as to form a space between the plurality of wire members;
abutting a foil cutting unit (3C) against the plurality of separated wire members so as to form a cut in the foil; and
opening the foil from the cut and removing the opened foil.

[10] A foil peeling apparatus (1) includes: an electric wire gripping unit (electric wire positioning unit 3A) configured to grip an electric wire which includes a wire member (101), an insulating layer covering the wire member, a foil (102) covering the insulating layer, and a sheath (104) covering the foil, the sheath being peeled off at a tip end portion such that the foil is exposed;
a foil cutting unit (3C) configured to form a cut in the exposed foil along an extending direction of the electric wire; and
a foil removal unit (foil removal apparatus 5) configured to open the foil from the cut and remove the opened foil.

According to the foil peeling apparatus having the above configuration [1] and the foil peeling method having the above configuration [9], the cut is formed between the separated wire members so as to open the foil and then the opened foil is removed without abutting any blade against the wire member, so that the foil can be removed without damaging the wire member. Moreover, since the foil can be removed without removing the electric wire, which is the multi-core wire including the wire member without any insulating layer on an inner side of the foil, from any equipment, so that terminal processing can be performed with high dimensional accuracy. Moreover, according to such configurations, it is not necessary to manually cut the foil and manage uncut materials, and thus automation is enabled, so that it is possible to improve processing quality.

In the present disclosure, the wire member (wire core) refers to a communication line including a signal line and a coating covering the signal line.

According to the foil peeling apparatus having the above configuration [2], the pressing blade whose blade angle is larger than that of the cutting blade is pressed between the plurality of wire members, so that the plurality of wire members are pressed via the foil in directions in which the plurality of wire members are separated from each other, and thus a space can be provided between the plurality of wire members. Moreover, the cutting blade whose blade angle is smaller than the pressing blade enters the space between the wire members while being abutted against the foil and cutting the foil, so that the cut can be formed in the foil without damaging the wire member.

According to the foil peeling apparatus having the above configuration [3], the pair of pressing blades which face each other are interposed between the plurality of wire members while the plurality of wire members are pressed via the foil in the directions in which the plurality of wire members are separated from each other, so that a distance between the wire members can be widened as compared with a case where one single pressing blade is provided.

According to the foil peeling apparatus having the above configuration [4], cuts can be formed by the pair of cutting blades at two opposite positions in the foil, so that the foil can be opened neatly.

According to the foil peeling apparatus having the above configuration [5], the opened foil peeled off from the wire member is cut by the foil cutting blade, so that the foil can be removed more accurately as compared with a case where the foil is pulled, broken, and then removed.

According to the foil peeling apparatus having the above configuration [6], the rotary brush is abutted against the foil and rotated, so that the foil can be peeled without damaging the wire member.

According to the foil peeling apparatus having the above configuration [7], the foil can be peeled by blowing air without damaging the wire member.

According to the foil peeling apparatus having the above configuration [8], since the foil cutting blade is provided on the foil chuck, the foil can be removed by gripping the opened foil while performing cutting.

According to one or more embodiments of the present invention, the foil of the shielded electric wire can be removed without damaging the wire member.

The invention claimed is:

1. A foil peeling apparatus for processing a multi-core electric wire, the multi-core electric wire including a plurality of wire members linearly arranged in parallel, a foil covering the plurality of wire members, and a sheath covering the foil, the sheath being peeled off at a tip end portion of the multi-core electric wire such that the foil is exposed, the foil peeling apparatus comprising:

an electric wire gripping unit configured to grip the multi-core electric wire, the electric wire gripping unit includes a pair of chucks that are movable toward each other to a closed position and away from each other to an opened position, the chucks grip the multi-core electric wire when the chucks are in the closed position and the multi-core electric wire is located between the chucks, a space extends between the chucks when the chucks are in the closed position;

a wire member space forming unit configured to be pressed against an exposed portion of the foil between the plurality of wire members so as to form a space between the plurality of wire members, the wire member space forming unit includes at least one pressing blade that is movable relative to the chucks and into the space when the chucks are in the closed position, the pressing blade is configured to displace the wire members away from each other when multi-core electric wire is gripped by the chucks and the pressing blade is in the space;

a foil cutting unit configured to be abutted against the exposed portion of the foil corresponding to the space formed between the plurality of wire members so as to form a cut in the foil, the foil cutting unit includes at least one cutting blade that is movable relative to the chucks and into the space when the chucks are in the closed position, the cutting blade is configured to cut the foil from the multi-core electric wire when multi-core electric wire is gripped by the chucks and the cutting blade is in the space; and a foil removal apparatus configured to open the foil from the cut, and cut the foil which has been opened, wherein the foil removal apparatus comprises a foil opening portion configured to open the foil along the cut and a foil cutting blade configured to cut the opened foil.

2. The foil peeling apparatus according to claim 1, wherein the pressing blade includes a pair of pressing blade surfaces that form a first angle, and wherein the at least one cutting blade includes a pair of cutting blade surfaces that form a second angle that is smaller than the first angle.

3. The foil peeling apparatus according to claim 2, wherein the at least one pressing blade comprises a pair of the pressing blades facing each other with the multi-core electric wire interposed therebetween, and wherein the wire member space forming unit forms the space between the plurality of wire members by placing the pair of pressing blades to be close to each other to press against the exposed portion of the foil between the plurality of wire members.

4. The foil peeling apparatus according to claim 2, wherein the at least one cutting blade comprises a pair of cutting blades facing each other with the multi-core electric wire interposed therebetween, and wherein the foil cutting unit forms the cut in the foil by abutting the pair of cutting blades against the exposed portion of the foil corresponding to the space formed between the plurality of wire members.

5. The foil peeling apparatus according to claim 1, wherein the foil opening portion comprises a rotary brush, and wherein the foil opening portion opens the foil by abutting the rotary brush against the foil in which the cut has been formed and rotating the rotary brush in a direction intersecting an extending direction of the multi-core electric wire.

6. The foil peeling apparatus according to claim 1,
wherein the foil opening portion opens the foil by blowing air from a tip end side of the multi-core electric wire to the foil in which the cut has been formed.

7. The foil peeling apparatus according to claim 1, further comprising:
a foil chuck configured to grip the opened foil,
wherein the foil cutting blade is provided on a part of the foil chuck.

\* \* \* \* \*